United States Patent Office  2,912,958
Patented Nov. 17, 1959

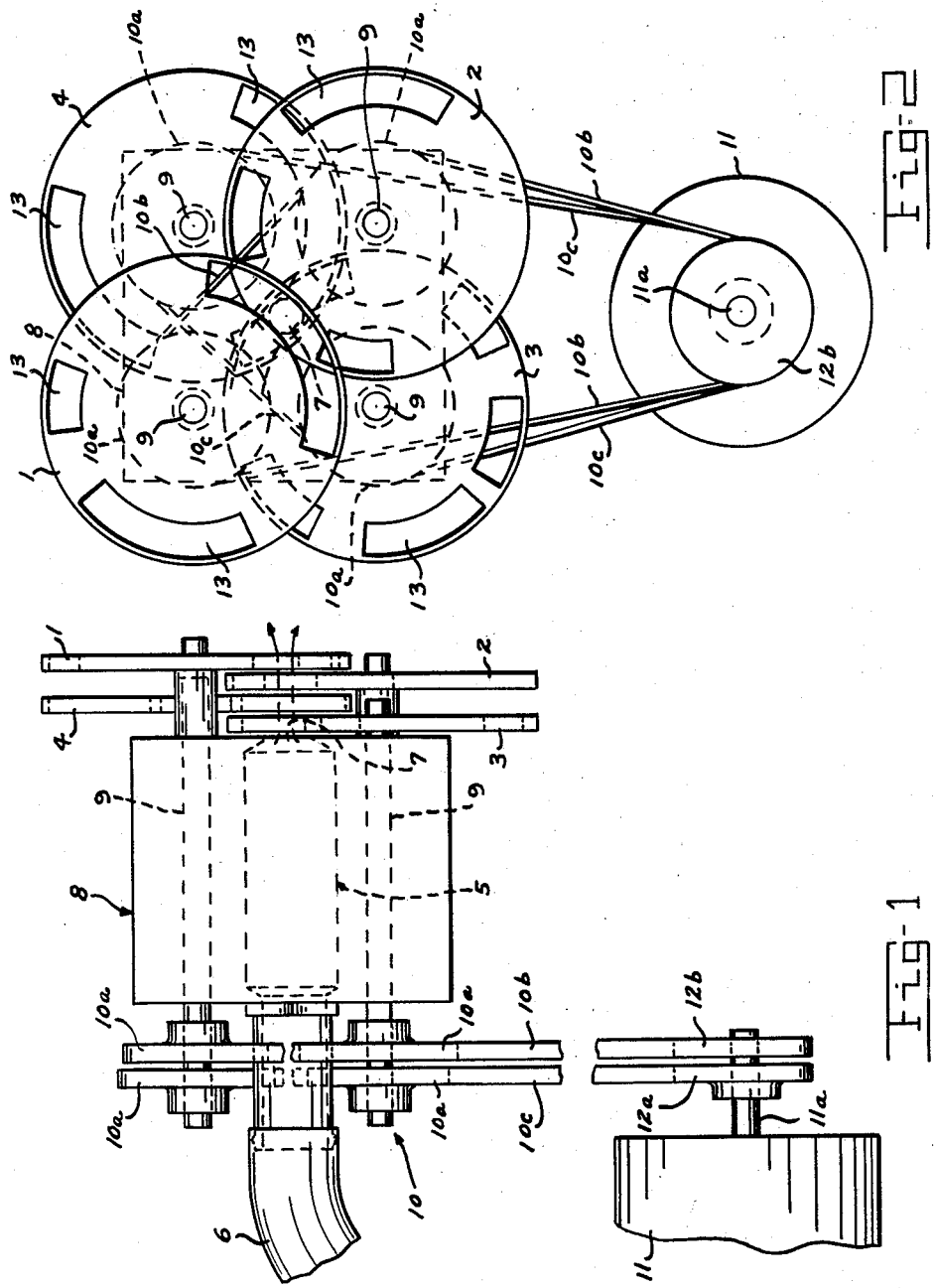

2,912,958

ACOUSTIC SIREN FOR GENERATING WIDE BAND NOISE

Henning E. Von Gierke, Medway, and John N. Cole, Fairborn, Ohio

Application July 11, 1958, Serial No. 748,099

5 Claims. (Cl. 116—147)

(Granted under Title 35, U.S. Code (1952), sec. 266)

The invention described herein may be manufactured and used by or for the United States Government for governmental purposes without payment to us of any royalty thereon.

This invention relates generally to the simulation of noise for purposes of test and, more specifically, to the utilization of a high intensity, wide band noise generator to simulate turbojet and rocket noise environments for testing of various components.

During the progress of a number of research programs, a definite need existed for the development of a high intensity, wide band noise generator which could simulate the noise environments of turbojet and rocket engines for the purposes of environmental testing of electronic components, structures and materials. Such simulated noise sources presently in use either frequently do not have adequate acoustical outputs due to low efficiencies or are unwieldy or unsuitable for practical laboratory use. In addition, those noise sources most commonly in use at the present and capable of high enough intensity have been found lacking in that they do not allow the simulation of random and wide band noise characteristics found in actual service environments, as for example, the noise environments normally found with the turbojet and rocket engines as well as aerodynamic boundary layer noise. An urgent need developed therefor for an economical, high intensity, wide band noise generator.

The acoustic siren device of the present invention has therefore been designed to meet the requirements indicated above for the generation of wide band noise with an efficiency and ease of operation facilitating the use of said device for laboratory tests and research programs.

An object of the present invention therefore resides in a unique acoustic siren which effects the random, mechanical modulation of an air jet stream.

A further object of the present invention utilizes a noise source in which a series of overlapping rotors are provided with randomly spaced slots to act on a jet stream in a random fashion.

A still further object of the invention provides an acoustic siren that modulates an air jet in a novel manner to produce sound pressures in random and wide band fashion to accurately simulate the noise characteristics of actual service environments.

An additional object of the invention resides in the utilization of a high intensity, wide band noise generator that is suitable for practical laboratory use in simulating the noise environments of turbojet and rocket engines.

Another object of the invention resides in a high intensity, wide band noise generator that simulates the characteristic noise environments of turbojet and rocket engines and, at the same time, eliminates the modulation of air jets in a periodic fashion generating a discrete frequency type noise wherein most of the acoustical energy is contained in a few narrow band widths frequency.

Other objects and advantages of the invention will become apparent from the following description, taken in connection with the accompanying drawings, in which like reference characters refer to like parts in the several figures.

Fig. 1 is a somewhat schematic plan view of the acoustic siren of the invention, illustrating the relationship between the exit orifice of the jet stream and the inventive rotor system.

Fig. 2 is a front view of the acoustic siren of Fig. 1, illustrating additional details of the plurality of rotors utilized therewith.

Referring specifically to Fig. 1 of the drawings, a chamber housing is indicated generally at 8 which housing 8 incorporates gas chamber 5 in communication at one end thereof with a hose 6 which hose is adapted to deliver compressed gas into the gas chamber 5. A circular nozzle orifice is indicated at 7 on the opposite end of the chamber 5 from which orifice the compressed gas delivered by the hose 6 to the interior of said chamber 5 is ejected in a jet stream. A plurality of shafts indicated at 9 are rotatably mounted in parallel and spaced relation within the chamber housing 8 in surrounding relation to chamber 5. It is seen that just beyond and adjacent the orifice 7 is positioned a series of partially overlapping rotors 1, 2, 3 and 4 which rotors are mounted on the shafts 9 for rotation therewith. On the other end of each of said shafts 9 is rigidly positioned a pulley-belt arrangement indicated generally at 10 and consisting of a driven pulley 10a and drive belts 10b and 10c. A variable speed motor indicated broken away generally at 11 includes a drive shaft 11a on which drive shaft is mounted a pair of drive pulleys 12a, 12b on which is mounted in pairs the previously mentioned drive belts 10b and 10c, one of which belts, 10b, extends from the outer drive pulley 12b around the respective driven pulleys 10a for the rotors 1 and 2 and the other of which belts, 10c, extends from the inner drive pulley 12a around the respective driven pulleys 10a for the rotors 3 and 4. It is seen therefore that the motor 11 drives the plurality of rotors 1, 2, 3 and 4 through the above-described belt-pulley arrangement.

Referring more particularly to Fig. 2 of the drawings, it is clearly seen that each of the previously described plurality of rotors 1, 2, 3, 4 incorporate a plurality of randomly spaced arcuate slots indicated at 13, said slots having randomly selected lengths. Moreover, it is noted that the ratio of the diameters of any two of the driven pulleys 10a is irrational. In this way, the repetition of the same position of the composite rotor grouping is unlikely. Thus, the compressed gas emerging through the nozzle orifice 7 is "chopped" or modulated by the rotating rotors 1, 2, 3, 4 and, more specifically, by the randomly spaced slots 13 incorporated therein. Therefore, it is seen that since the combined rotors modulate the exit area of the nozzle orifice in a ramdom fashion, the volume flow of compressed gas being ejected through the nozzle orifice 7 is "chopped" or modulated randomly by the rotating rotors 1-4 and the randomly spaced slots 13 positioned therein resulting in a randomly modulated gas stream radiating noise of random character.

The rotational speeds of the several rotors 1-4 have been indicated as being randomized by means of varying the diameters of a respective pair of driven pulleys; however, each rotor may be operated by a separate motor whose speed is controlled by an individual, continuously rotating potentiometer. All four potentiometers are slowly driven through a belt-pulley arrangement by a fifth motor with the belt-pulley system utilized therewith being such that the ratio of rotational rates therein is irrational.

Thus, a new and unique acoustic siren has been developed by the present invention wherein a random, mechanical modulation of an air jet flow is effected to create a high intensity, wide band noise by means of a novel system employing a series of overlapping, randomly slotted rotors revolving at different and irrationally related speeds to produce the random mechanical modulation and the resulting wide band noise.

We claim:

1. An acoustic siren comprising a housing incorporating a gas chamber, an inlet hose connection in said housing adaptable for connection to a source of compressed gas and in communication with the gas chamber of said housing to deliver compressed gas thereinto, a jet nozzle incorporated in said housing in communication with the gas chamber thereof to eject said compressed gas in a jet stream therefrom, a series of driven shafts rotatably positioned within said housing adjacent to and surrounding the gas chamber, a plurality of driven pulleys mounted on said driven shafts remote from said jet nozzle, a plurality of rotors positioned on said driven shafts remote from said driven pulleys and arranged in partially overlapping relation to each other immediately over said jet nozzle in the path of the jet stream, each of said plurality of rotors incorporating a series of arcuate slots randomly spaced relative to the arcuate slots disposed on adjacently positioned rotors, and randomly operated variable speed motor drive means in driving engagement with said driven pulleys to drive said rotors each at independent, random speeds relative to one another to impart a random disturbance to the jet stream of compressed gas being ejected from said chamber.

2. An acoustic siren as in claim 1, wherein the diameters of said driven pulleys are different and unrelated to each other and said variable speed motor drive means incorporates a drive shaft, a pair of drive pulleys affixed on said drive shaft, and a pair of endless cables interconnected between said pair of drive pulleys and said plurality of unrelated diameter driven pulleys to impart rotation thereof at independent and unrelated speeds.

3. An acoustic siren comprising a main housing having a relatively elongated air chamber therein, an air hose adapted for communication with the interior of said air chamber to deliver compressed air thereinto, a circular jet nozzle in communication with the air chamber of said housing remote from said air hose to supply a jet stream therefrom, a plurality of shafts rotatably mounted in said main housing surrounding the air chamber in spaced, parallel relation to each other and extending parallel to the longitudinal axis of the air chamber, a rotor affixed to each of said shafts in partially overlapping relation to each other over the said jet nozzle, a plurality of driven pulleys affixed to each of said shafts remote from said rotors, the ratio of the diameters of any two of said driven pulleys being completely unrelated, and drive means interconnected between said driven pulleys and power means for driving the rotors affixed on said shafts remote from said pulleys at different, unrelated speeds relative to each other to randomly modulate the jet stream supplied from said jet nozzle.

4. An acoustic siren as in claim 3, said rotors each having a plurality of randomly spaced, arcuate slots of randomly selected lengths modulating in concerted action the exit area of the jet stream emerging from said jet nozzle to radiate noise of random character.

5. A high-intensity, wide-band noise generator comprising an acoustic siren housing having compressed gas inlet conduit means in communication with the interior thereof, a restricted nozzle ejecting a jet stream of compressed gas delivered into the interior of said housing by said inlet conduit means, and means for randomly modulating the jet stream of compressed gas ejected by said restricted nozzle, said means comprising at least one pair of adjacently and partially overlapping rotors rotating at independent and unrelated speeds and positioned directly in front of said restricted nozzle in the path of the jet stream, a driven shaft for each of said rotors rotatably mounted within said housing and separate motor-drive means in driving engagement with a selected driven shaft driving each of said rotors at independent and unrelated speeds relative to each other to act on and nonperiodically interrupt the jet stream of compressed gas being ejected from said restricted nozzle, each of said rotors having a series of arcuate openings therein of randomly selected lengths and disposition relative to each other to insure a combined random modulation of the compressed gas emerging from said restricted nozzle.

References Cited in the file of this patent
UNITED STATES PATENTS

| | | |
|---|---|---|
| 1,156,329 | Thomas | Oct. 12, 1915 |
| 1,786,264 | Reed | Dec. 23, 1930 |
| 2,153,500 | Eaves | Apr. 4, 1939 |
| 2,667,812 | Miller | Feb. 2, 1954 |
| 2,730,067 | Schaufler | Jan. 10, 1956 |